(12) United States Patent
Bowers (10) Patent No.: US 7,716,493 B2
(45) Date of Patent: May 11, 2010

(54) METHOD AND APPARATUS FOR MANAGING CONFIDENTIAL INFORMATION

(76) Inventor: Charles R. Bowers, 2000 NE. 42nd Ave., Suite 121, Portland, OR (US) 97213

( * ) Notice: Subject to any disclaimer, the term of this patent is extended or adjusted under 35 U.S.C. 154(b) by 320 days.

(21) Appl. No.: 11/955,306

(22) Filed: Dec. 12, 2007

(65) Prior Publication Data

US 2008/0091953 A1    Apr. 17, 2008

Related U.S. Application Data

(63) Continuation of application No. 10/623,337, filed on Jul. 18, 2003, now Pat. No. 7,334,130.

(60) Provisional application No. 60/397,032, filed on Jul. 19, 2002.

(51) Int. Cl.
    *G06F 21/00* (2006.01)

(52) U.S. Cl. ................. 713/186; 713/172; 713/185; 713/193; 726/27; 726/28

(58) Field of Classification Search ........... None
    See application file for complete search history.

(56) References Cited

U.S. PATENT DOCUMENTS

| | | |
|---|---|---|
| 6,938,163 B1 | 8/2005 | Birkler |
| 6,944,761 B2 | 9/2005 | Wood et al. |
| 6,948,066 B2 | 9/2005 | Hind et al. |
| 6,990,588 B1 | 1/2006 | Yasukura |
| 7,085,925 B2 | 8/2006 | Hanna et al. |
| 7,111,173 B1 | 9/2006 | Scheidt |
| 7,137,008 B1 | 11/2006 | Hamid et al. |
| 7,143,292 B2 | 11/2006 | Hamada |
| 7,200,756 B2 | 4/2007 | Griffin et al. |
| 2002/0188855 A1 | 12/2002 | Nakayama et al. |
| 2003/0101348 A1 | 5/2003 | Russo et al. |

*Primary Examiner*—Minh Dinh
(74) *Attorney, Agent, or Firm*—Brian G Forrest; Hughes Law Firm, PLLC (57) ABSTRACT

The invention is a method and apparatus for managing the secure acquisition, storage and disclosure of confidential information using biometric keys to lock data storage devices, a secure data input/output device and authorization procedures to facilitate identity rights management; and/or metadata querying techniques to preserve the anonymity of disclosed personal data.

18 Claims, 7 Drawing Sheets

METHOD AND APPARATUS FOR MANAGING CONFIDENTIAL INFORMATION

CROSS REFERENCE TO RELATED APPLICATIONS

This application is a continuation of U.S. patent application Ser. No. 10/623,337 filed Jul. 18, 2003, which in turn claims priority to U.S. Provisional Patent Application Ser. No. 60/397,032 filed Jul. 19, 2002. Both applications are hereby incorporated by reference in their entirety for all purposes.

TECHNICAL FIELD

The present invention relates to the field of security management information systems. In particular, the present invention relates to a security management system used to provide secure acquisition, storage and disclosure of confidential information.

BACKGROUND

Throughout history and across all cultures, societies have engaged in a balancing act between the virtues of a society in which thoughts and information flow freely, and the benefits of privacy and security. The tension between these social objectives is seen in many areas.

In the context of industrial and technological development, societies wish to encourage the creation of new and useful ideas. To do so, society must on one hand give creative citizens the right to own, profit from and protect the confidentiality of their own creative ideas. On the other hand, society must also compel the open disclosure of those creative ideas for the benefit of all. This tension is played out in the creation and enforcement of intellectual property laws.

In the context of business and commerce, society seeks the broad dissemination of market information to reduce the friction and inefficiencies of commercial transactions. On the other hand, society also wishes to protect the privacy of individuals and businesses whose commercial profiles constitute that market information. This tension is played out in the creation and enforcement of privacy laws.

In the broader social context, while all societies have an interest in knowing about and regulating their citizens for the safety of society as a whole, many societies also choose to protect the freedom and privacy of their citizens from government intrusion. Highly regulated societies in which the government scrutinizes the activities of its own citizens often have very low crime rates and a secure environment, while very open societies that protect privacy and anonymity must often tolerate higher crime rates and a less secure social environment. This tension is played out in the laws regulating criminal investigations and law enforcement.

To date, this balancing act between the preservation of an open society and the protection of privacy has been a "zero sum game." In the arena of technological and industrial development, when society tightly guards commercial intellectual property, development of new ideas and technology can be impaired. This phenomenon is widely reported and debated with respect to copyright protection on the Internet. Many denizens of the Internet strenuously argue that "information must be free" on the Internet to promote the speedy development of new ideas. Yet many others argue that the widespread copying and dissemination of private or proprietary information on the Internet discourages innovation by undermining a creator's right to protect and benefit from his or her creations. The proponents of each side of the argument believe that to the extent one agenda is advanced, the other must be diminished.

In the context of commercial information, commercial interests strenuously seek protection of their right to "mine" and aggregate commercial databases through both traditional means and through the new "clickstream" monitoring technologies available on the Internet. On the other hand, citizens strenuously seek protection of their privacy against such Big Brother invasiveness. Here too, the proponents on each side of the debate believe that to advance one objective is to diminish the other.

A similar debate with respect to personal or other confidential information has arisen since the unnerving events of September 11th. In the United States, the events of Sep. 11, 2001 have resulted in an intense public discourse over the wisdom of adjusting our own balance from an historically open society affording a great degree of freedom and privacy for citizens, to one that sacrifices a degree of that freedom and privacy for better protection against terrorism. To date, the discourse has continued to treat the issue as a zero sum game: that is, we must decide how much privacy and anonymity we are willing to give up to be safer. From diatribes over the U.S. Patriot Act to debates on national ID cards, there is an intense interest in how the balance is adjusted.

Fortunately, biometric and database technologies have evolved to a point where addressing both areas of concern need not involve a zero sum game. In the industrial, business, commercial, law enforcement and other social contexts, the integration of these technologies to make personal or other sensitive information available to parties who need it without relinquishing control of the information or compromising our privacy and anonymity presents a unique set of challenges, requiring a new and novel solution.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, various aspects of the present invention, a method and apparatus for a confidential information management system, are described. Specific details are set forth in order to provide a thorough description. However, it is understood the embodiments of the invention may be practices with one some or all of these aspects, and with or without some or all of the specific details. Repeated usage of the phrase "in one embodiment" does not necessarily refer to the same embodiment, although it may.

In some instances, well-known techniques of security management have been omitted or simplified in order not to obscure the understanding of this description. For example, specific details are not provided as to certain encryption technology used to implement the present invention as these techniques are well known by those skilled in the art.

Parts of the description are presented using terminology commonly employed to describe operations performed by a computer system or a biometric generation device. Some of these operations involve storing, transferring, combining and otherwise manipulating signals through electrical, magnetic or optical components of the system. The term "system" includes general purpose as well as special purpose arrangements of these components that are standalone, adjunct or embedded.

Figure 1:
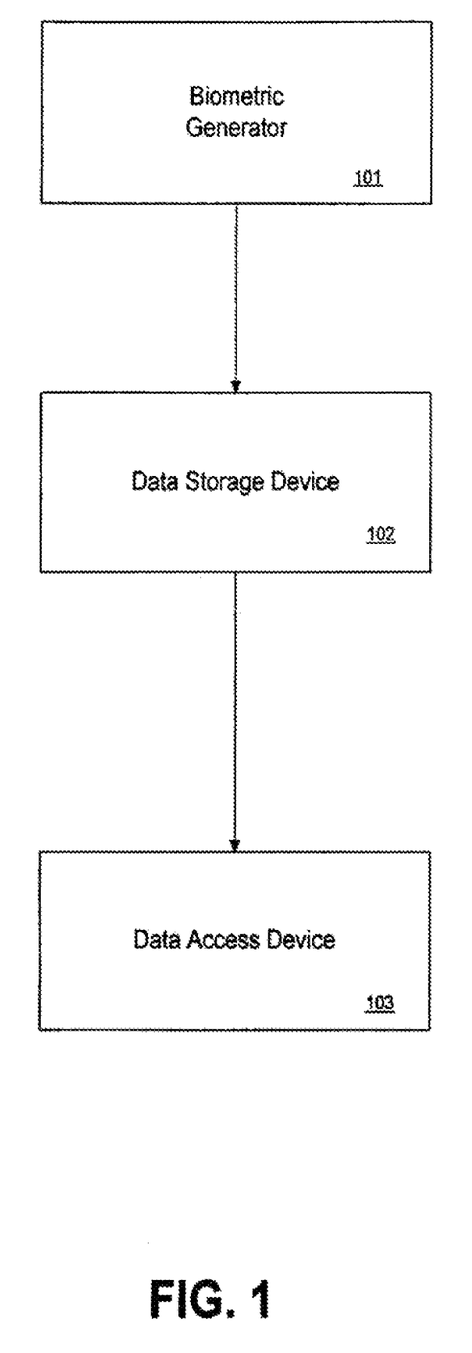
FIG. 1 is a block diagram illustrating a generalized embodiment of selected components of a confidential information management system in accordance with one embodiment of the invention, and the operating environment in which certain aspects of the invention may be practiced.

Refer now to FIG. 1, which is a block diagram illustrating a generalized embodiment of selected components of a confidential information management system in accordance with one embodiment of the invention, and the operating environment in which certain aspects of the invention may be practiced. As shown, the confidential information management system includes a biometric generator (scanner 101), a device used to analyze a highly unique biological characteristic of an individual in a manner that captures that characteristic of the individual in a reliable and replicable way. The captured unique biometric characteristic is referred to as a "biometric signature." To facilitate the disclosure of the present invention, the term "scanner" is used interchangeably with the term "biometric generator" but this is not meant as a limitation. As is understood by those in the art and contemplated by the invention, the biometric generator may include a retinal scanner, a fingerprint scanner, a face recognition system, a voice identification system, a gait analysis device, a DNA analysis system, etc. In one embodiment, the generator analyzes the results of the biological scan, analysis, etc. and converts it to a digital signature which is reliably replicable.

Each scanner 101 includes a unique identifier that enables the identification of scanner 101 as the source of the biometric signature. In one embodiment, the unique identifier of scanner 101 may be implemented as an encrypted digital serial number. However, other techniques for implementing the unique identifier may be employed without departing from the scope of the invention.

Referring again to FIG. 1, the confidential information management system further includes a data storage device (token 102) to store confidential information about the individual. Because the data storage device is usually, but not necessarily, portable and make take the form of a smart card or other similar data storage medium, the term "token" is used interchangeably with the term "data storage device" in the disclosure of the present invention; however, the methods described herein are applicable to other forms of data storage. The biometric signature is bonded to token 102 so that any access to the confidential information stored on token 102 requires reconfirmation of the biometric signature. In one embodiment of the invention, bonding the biometric signature to token 102 generates a unique private encryption key used to encrypt the confidential information before storing it on token 102. Nothing on token 102, including the private encryption key, may be accessed unless token 102 is unlocked by the presentment of a biometric signature matching the biometric signature originally bonded to token 102.

Referring yet again to FIG. 1, the confidential information management system further includes a data access device (console 103), which mediates the entry of information onto, and queries against, token 102. Console 103 further facilitates the management, by the individual who is the owner of the confidential information, of the nature and scope of information requested by a querying party as well as the display of information authorized for disclosure to the querying party. In one embodiment, console 103 comprises a data input/output (I/O) mechanism, such as a card reader, a keypad, and a display. Similar to scanner 101, each console 103 includes a unique identifier that enables the identification of the source of the entry of, or access to information on token 102. In one embodiment, the unique identifier of console 103 may be implemented as an encrypted digital serial number; however, other techniques for implementing the unique identifier may be employed without departing from the scope of the invention. Alternatively, the biometric generator and the data console may be in a single unit or the matching of the biometric signatures could be done at the biometric generator.

Turning now to FIGS. 2-6, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computer causes the processor of the computer to perform an action or a produce a result.

Figure 2:
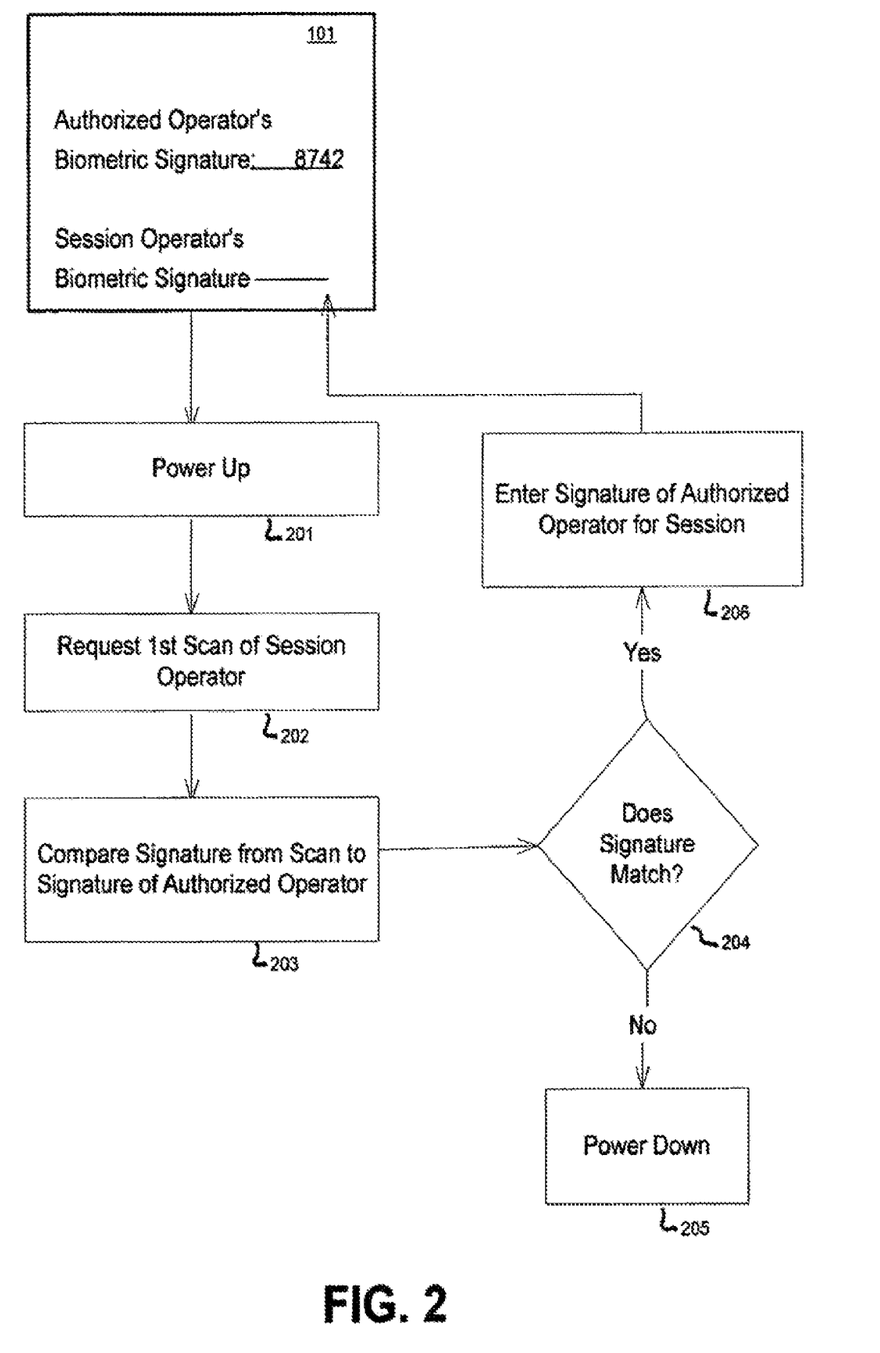
FIG. 2 is a flow diagram illustrating initializing the biometric generator, an aspect of a method to be performed by a confidential information management system in accordance with one embodiment of the invention.

FIG. 2 is a flow diagram illustrating initializing the scanner, an aspect of a method to be performed by a confidential information management system in accordance with one embodiment of the invention. One of the challenges in a confidential information management system is the ability to safeguard against rogue biometric generator operators. A rogue operator would be someone who does not have the proper authority to use biometric generator 101 or whose use of biometric generator 101 results in biometric signatures that are flawed, substandard, discredited, etc. In the embodiment illustrated in FIG. 2, scanner 101 initializes operation by requiring an operator of scanner 101 to present themselves for analysis and capture of the operator's own biometric characteristic. Scanner 101 records the operator's biometric characteristic in a short-term memory of scanner 101, along with the time and date of the analysis and capture, and further identifies the biometric characteristic as the biometric signature of the current operator. In one embodiment, scanner 101 may be further configured to operate only upon initialization by an individual, or individuals, whose biometric characteristics are included in a set of authorized biometric signatures. Initialization of scanner 101 advantageously enables subsequent data credibility checks described below, including the ability to publish the identities of rogue generator operators, and thereby discount the credibility of data on token 202 recorded by that operator. Initialization of scanner 101 also results in an increase in data credibility by allowing institutions to limit the pool of persons who are authorized to operate scanner 101.

Referring to FIG. 2, in one embodiment, scanner 101 has an authorized operator's biometric signature stored in memory. Upon power up, block 201, the request for the first scan of the session, block 202, is a scan for the current operator's biometric signature. In block 203, the current operator's biometric signature is compared to the stored authorized operator's biometric signature. If the comparison, shown in clock 204, is negative, the scanner shuts down, block 205, and does not allow further scans. If the comparison, block 204, is positive, the current operator is the authorized operator and, as shown in block 206, his biometric signature is entered as the session operator of scanner 101.

Figure 3:
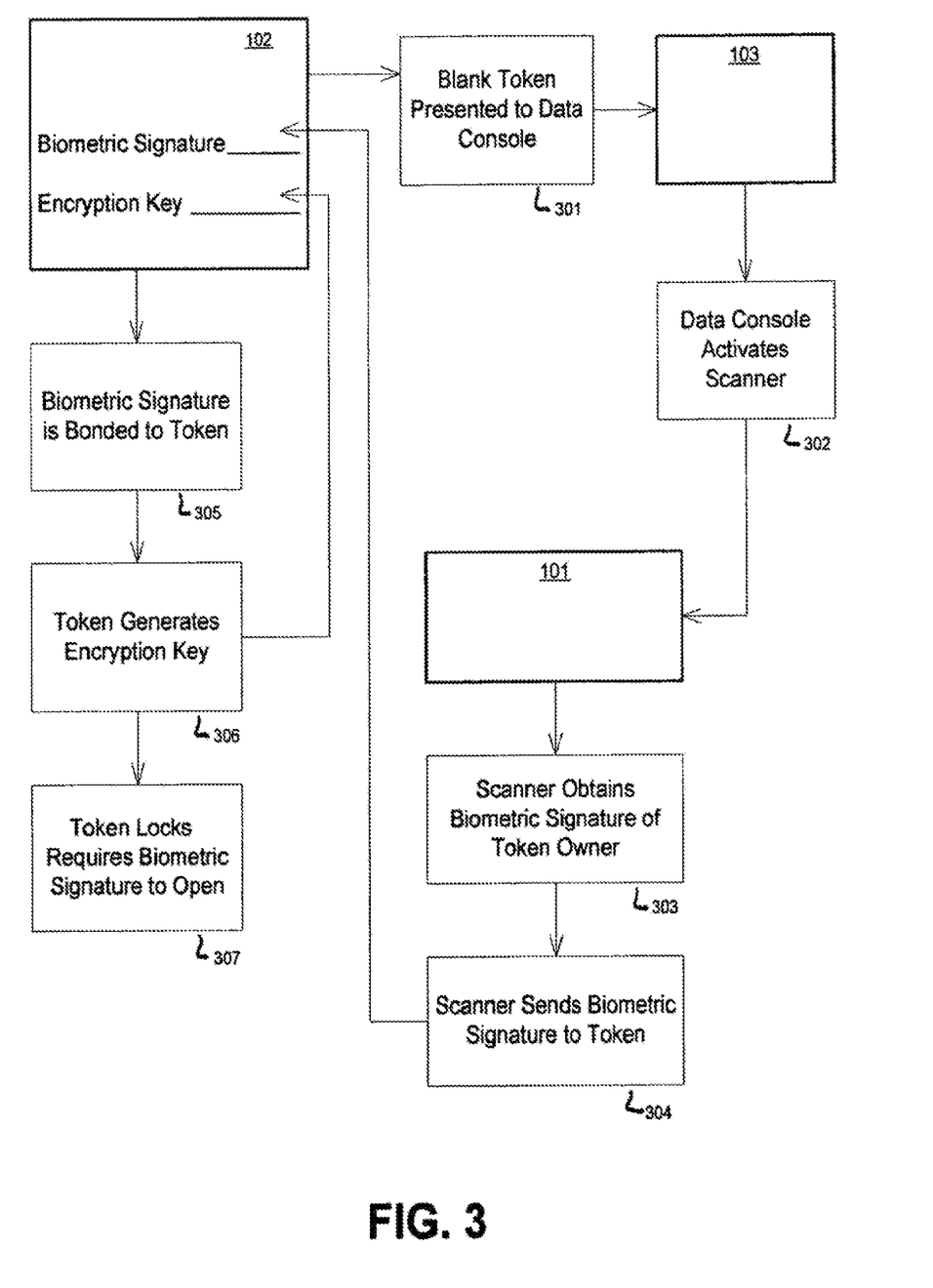
FIG. 3 is a flow diagram illustrating bonding a biometric signature to a token, an aspect of a method to be performed by a confidential information management system in accordance with one embodiment of the invention.

FIG. 3 is a flow diagram illustrating bonding a biometric signature to a token, an aspect of a method to be performed by a confidential information management system in accordance with one embodiment of the invention. A blank token 102 is designed to accept, upon first initialization, a digital signature correlating to the results of a captured biometric characteristic of the token owner. Upon the entry of the digital signature, the confidential information management system executes an algorithm that bonds the digital signature from the biometric generator, scanner 101, to token 102, randomly generates a unique digital private key for strong encryption; and sets token 102 to remain locked upon subsequent initializations unless presented with a digital biometric signature having a sufficiently high correlation to the original bonded digital signature such that positive identification is assured.

Referring to FIG. 3, in one embodiment, blank token 102 is presented to data console 103 at block 301. Console 103 activates scanner 101 at block 302. Scanner 101 obtains biometric signature 110 of the token owner at block 303. In block 304, scanner 101 sends biometric signature 110 of the token owner at block 303. In block 304, scanner 101 sends biometric signature 110 to token 102. The biometric signature 110 is bonded to token 102 in block 305 and token 102 generates an encryption key, block 306, which is entered on token 102. At block 307, token 102 locks and requires biometric signature 110 to open.

Data credibility can be enhanced by controlling who can enter data and by binding the identity of the data entry operator to each piece of data so entered. Specifically, for a token 102 to be "opened" to enter new data, it must be presented with the biometric digital signature of the token owner. For a data console 103 to add data to an opened token 102, the console 103 must be presented with the opened token 102 of a data entry person containing a data entry authorization code. That way, if it is learned that a particular data entry person/entity is unreliable, such information can be broadcast so that the credibility coefficient of the data entered by such a person can be reduced. This technique is further described in FIG. 4.

Figure 4:
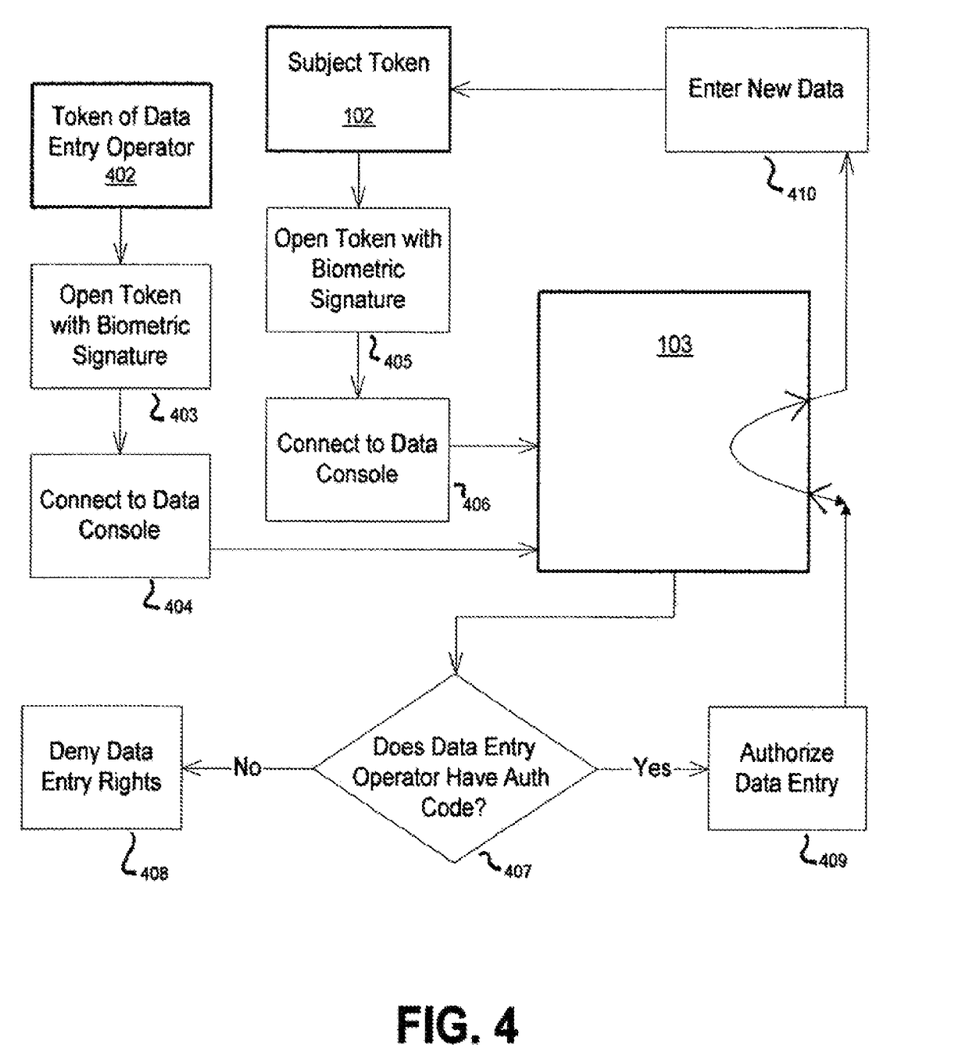
FIG. 4 is a flow diagram illustrating adding personal data to the token, an aspect of a method to be performed by a confidential information management system in accordance with one embodiment of the invention.

FIG. 4 is a flow diagram illustrating adding personal data to the token, an aspect of a method to be performed by a confidential information management system in accordance with one embodiment of the invention. As shown, to enter data onto a token 102, one must possess a data entry authorization code. The code is issued by a trusted third party, and is bonded to the token of the party so authorized. For a token 102 to have data added to it, the token 102 must be opened using the biometric signature of the token owner, and the data console 103 must be presented with the biometrically opened token of a party possessing a data entry authorization code. The console 103 is used to enter the data, which is then bonded to the token 102 along with the identification of the authorization information of the data entry operator.

Referring to FIG. 4, in one embodiment, an individual presents her token 102 for a transaction which involves adding data to the token, for example, during a transaction where sales history will be stored on the token 102. In block 405, token 102 is opened using the same method shown in FIG. 3. The individual's biometric signature is obtained and compared to the biometric signature stored on token 102 and upon confirmation, the individual is given access to data console 103, as depicted in block 406. The data entry operator's token 402 is opened using the same process, block 403, and the data entry operator is given access, block 404, to data console 103. In addition, an authorization code bonded to the data entry operator's token is tested, block 407. If the authorization code is absent or incorrect, data entry is denied, block 408. If the authorization code is present and correct, block 407, data entry is authorized, block 409, the data entry operator is allowed access to the data console 103, and new data can be entered, block 410, onto the individual's token 102.

In one embodiment, each piece of personal or other confidential data entered on token 102 can carry a credibility weight based upon the various credibility coefficients attached to it. For example, each piece of confidential information entered onto a token 102 may be linked to: (a) a specific scanner 101; (b) a specific scanner operator; (c) a specific date and time; and (d) a specific data entry authorization code. If the credibility of any of those elements of the data entry process is called into question, the credibility coefficient of the confidential data in that record may be appropriately reduced and broadcast to all data consoles and to all parties authorized to query tokens. The broadcasting of such credibility information could work much like the current system in place for notifying vendors of stolen credit card numbers. An example of a data record and credibility coefficient for an individual for a specific entry date is illustrated in Table 1.

TABLE 1

| Serial No. of Scanner that opened token of owner (Scanner 1) | Serial No. of Scanner that opened token of data entry operator (Scanner 2) | Digital Signature of Scanner 1's Operator | Digital Signature of Scanner 2's Operator | Serial No. of Data Console | Data Entry Authorization code | Credibility Coefficient |
| --- | --- | --- | --- | --- | --- | --- |
| AZ9993420 | BN087923 | 011100011010010001 | 0110100111101010 | AK5950102 | 98720 | 8/10 |

In some cases a party trusted for purposes of guaranteeing the credibility of certain types of data may not necessarily be reliable with respect to other types of data. Therefore, the relative trustworthiness and security of all entities being granted data entry authorization codes is "baked into" the data entry authorization code, and thus into every piece of data put onto a token 102. As a result, the data entry authorization code has a credibility coefficient limited to certain data types. If data of other types is entered, the credibility coefficient may be zero.

Figure 5:
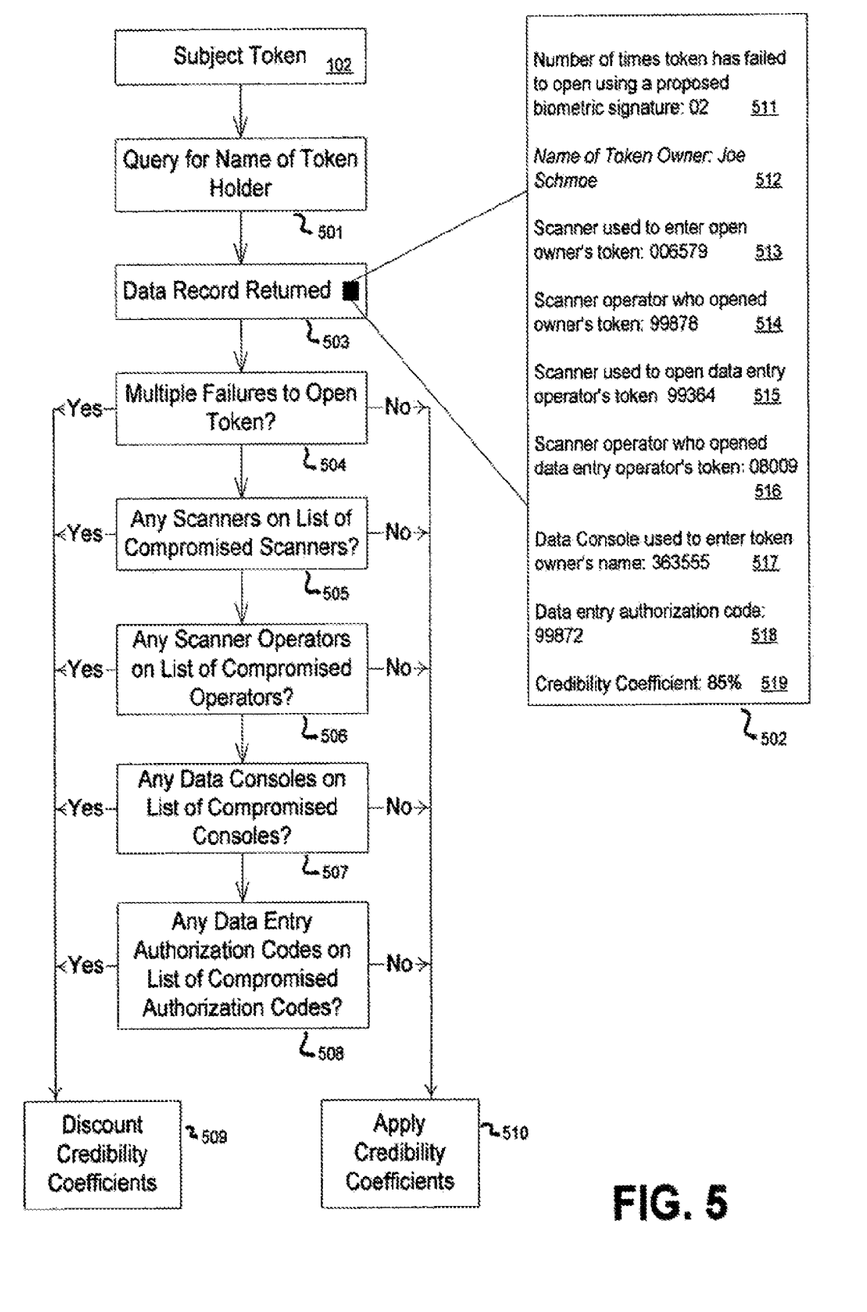
FIG. 5 is a flow diagram illustrating methods of ensuring data credibility, an aspect of a method to be performed by a confidential information management system in accordance with one embodiment of the invention.

FIG. 5 is a flow diagram illustrating methods of ensuring data credibility, an aspect of a method to be performed by a confidential information management system in accordance with one embodiment of the invention. In particular, FIG. 5 illustrates a generalized embodiment of ensuring data credibility in accordance with one embodiment of the invention. Each data record entered onto a token 102 may contain, as part of the record, data relating to the acquisition of and access to the data record that affects the credibility of the data.

In one embodiment, the digital serial number of the biometric scanner 101 used to acquire the digital signature may be included in the data record. In the event it becomes known that a particular biometric scanner 101 has become compromised, the digital serial number of that scanner 101 can be published, and the credibility coefficient of any data record created with that scanner 101 can be appropriately reduced-potentially to zero. A data record entered onto a token 102 may contain as part of the record, the digital signature of the biometric scanner operator. In the event it becomes known that a particular biometric scanner operator is unreliable, the digital signature of that scanner operator can be published, and the credibility coefficient of any data record created by that scanner operator can be appropriately reduced-potentially to zero. Similarly, in the event that multiple failures to open a token 102 occur, the credibility coefficient of any data record on that token 102 can be appropriately reduced.

Each piece of data entered onto a token will further contain, as part of the data record, a data credibility coefficient indicating the relative trustworthiness of the data. Credibility coefficients may be assigned to specific operators of specific biometric scanners, for example by a trusted private party through the issuance of data entry authorization codes. To enter data onto a token, the token may be opened with the biometric digital signature of the token owner, and the party adding data must activate the data entry function in the console by presenting their own biometrically opened token possessing a data entry authorization code. That code will contain the credibility coefficient of the party entering data, which will be limited to a specifically delimited type of data.

For example, authorized trusted workers at a state DMV office may be authorized to enter driver's license information on a token with a high credibility coefficient. Other parties attempting to add such data would have a credibility coefficient of zero, resulting in a negation of reliance on such information. Further, data about, for example, academic records, entered by a DMV official would also receive a low credibility coefficient.

In the embodiment depicted in FIG. 5, token 102 is queried for the name of the token holder in block 501. Data record 502 returned in block 503 includes the number of times token 102 has failed to open using a proposed biometric signature 511, the name of the token owner 512, an identifier of the scanner used to open owner's token 513, an identifier of the scanner operator who opened owner's token 514, an identifier of the scanner used to open data entry operator's token 515, an identifier of the scanner operator who opened data entry operator's token 516, an identifier of the data console used to enter token owner's name 517, a data entry authorization code, a credibility coefficient 519. Data records may include these same fields or different fields depending on the embodiment.

In FIG. 5, various items in the data record 502 are used to determine a credibility coefficient. The credibility coefficient is discounted in block 509 or used without change (applied) in block 510 depending on the values of the data items. In block 504, a record of multiple failures to open token 102 results in a discounted credibility coefficient; as does any scanners on the list of compromised scanners, block 505; any scanner operators on the list of compromised operator, block 506; any data consoles on the list of compromised consoles, block 507; and any data entry authorization codes on the list of compromised authorization codes, block 508.

The process of a metadata query allows a token owner to control whether to release specific confidential data to a querying party, or to release the results of a metadata query allowing the querying party to evaluate the answer to a specific question. By protecting the confidentiality of the metadata query contents, token owners are prevented from "gaming the system" by accumulating specific data known to be important for a particular application.

Figure 6:
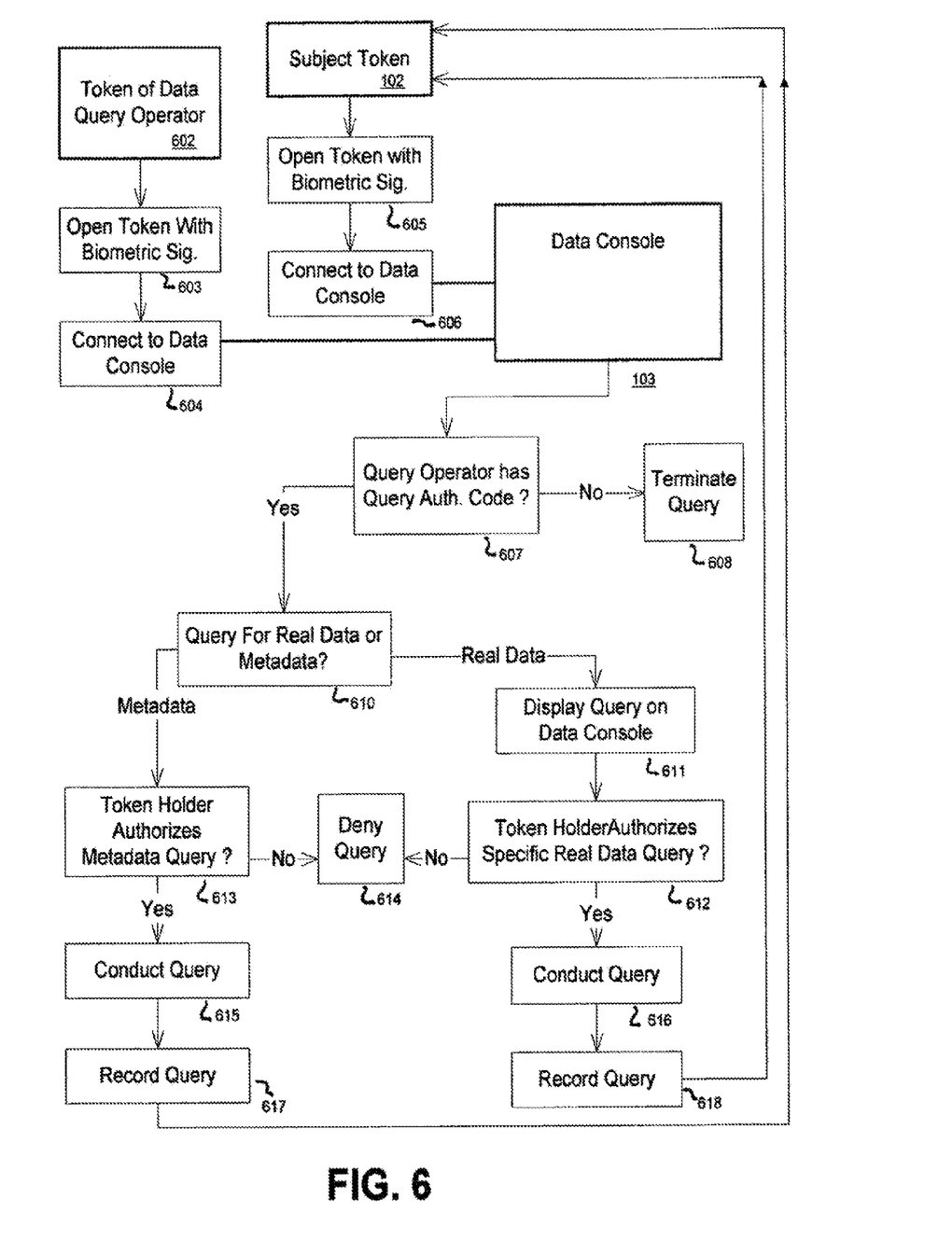
FIG. 6 is a flow diagram illustrating a method of querying data on a token, an aspect of a method to be performed by a confidential information management system in accordance with one embodiment of the invention.

FIG. 6 is a flow diagram illustrating a method of querying data on a token, an aspect of a method to be performed by a confidential information management system in accordance with one embodiment of the invention. In particular, FIG. 6 illustrates a generalized embodiment of querying data in accordance with one embodiment of the invention. To query data on a token, one must possess a data query authorization code. The code is issued by a trusted third party, such as a bank, etc., and is bonded to the token of the party so authorized.

In block 605, the subject token 102 is opened using the biometric signature of the token owner. As discussed above, the biometric characteristic of the subject is scanned and compared to the biometric signature stored on the token 102 and if there is a match, the token is opened allowing a connection to the data console 103 at block 606.

In block 603, the token of the data query operator is opened using the biometric signature of the data query operator by the same technique discussed above and console 103 must be presented with a biometrically opened token which contains a data query authorization code, shown in block 604. At block 607 the data query authorization code is checked. If the token of the data query operator lacks a credible authorization code, the query is terminated, block 608.

In block 610, Console 103 is used to enter the data query, and the nature and extent of the query is displayed on the console display for the token owner's review. If specific (real) confidential information is asked for, the console displays the query, block 611. The token owner will either authorize or deny release of such information, block 612. The token owner can either deny the query, block 614, or authorize the query in which case the query is conducted at block 616. If a metadata query is presented, such query is not displayed on the console, but the token owner is requested to authorize release of the metadata, block 613. The token owner can either deny the query, block 614, or authorize the query in which case the query is conducted at block 615.

In one embodiment, for example, the query might ask for release of specific confidential information, such as name and driver's license number, or it might ask for metadata, such as whether the specific data on a token reflects a good risk for a car rental.

An example of metadata query is illustrated in Table 2. The query is for admission onto an Oregon political action campaign mailing list.

TABLE 2

| Query | "Yes" Value | "No" Value | × | Credibility Rating | = | Total Value |
|---|---|---|---|---|---|---|
| Oregon Resident? | 20 | — | × | 3 | = | 60 |
| Over 18 years old? | 10 | — | × | 4 | = | 40 |
| Registered to vote? | — | −7 | × | 6 | = | −42 |
| Democrat? | 15 | — | × | 2 | = | 30 |
| Metadata Query Return Value | | | | | | 88 |

In this example, the issue is whether to offer the token holder admission onto a political action campaign mailing list. The list owner determined that a minimum score of 100 would be required before admission onto the list would be offered. The fact that there was highly reliable information that the person was not registered to vote and only weakly reliable information that the person was a Democrat disqualified this person from being offered admission. This decision was made without the disclosure of any confidential information. The only thing the querying party received from this process was a score of 88.

To protect the integrity of the system, a process is provided for evaluating if and when data queries are used in an unintended, abusive manner. At block 617 and block 618 a record of the query is stored on token 102. Because each entity querying a token must have a data query authorization code, a record of each query made, including the identity of the querying party, the biometric scanner involved, the date and time of the query, and the nature and extent of each data release can be placed on a token. This information is potentially useful to a token owner in case someone abuses the querying process or the disclosure of confidential data. It is also potentially useful information for law enforcement agencies with appropriate subpoenas. However, as discussed above, this information would generally be locked to all parties to prevent them from "gaming the system."

Figure 7:
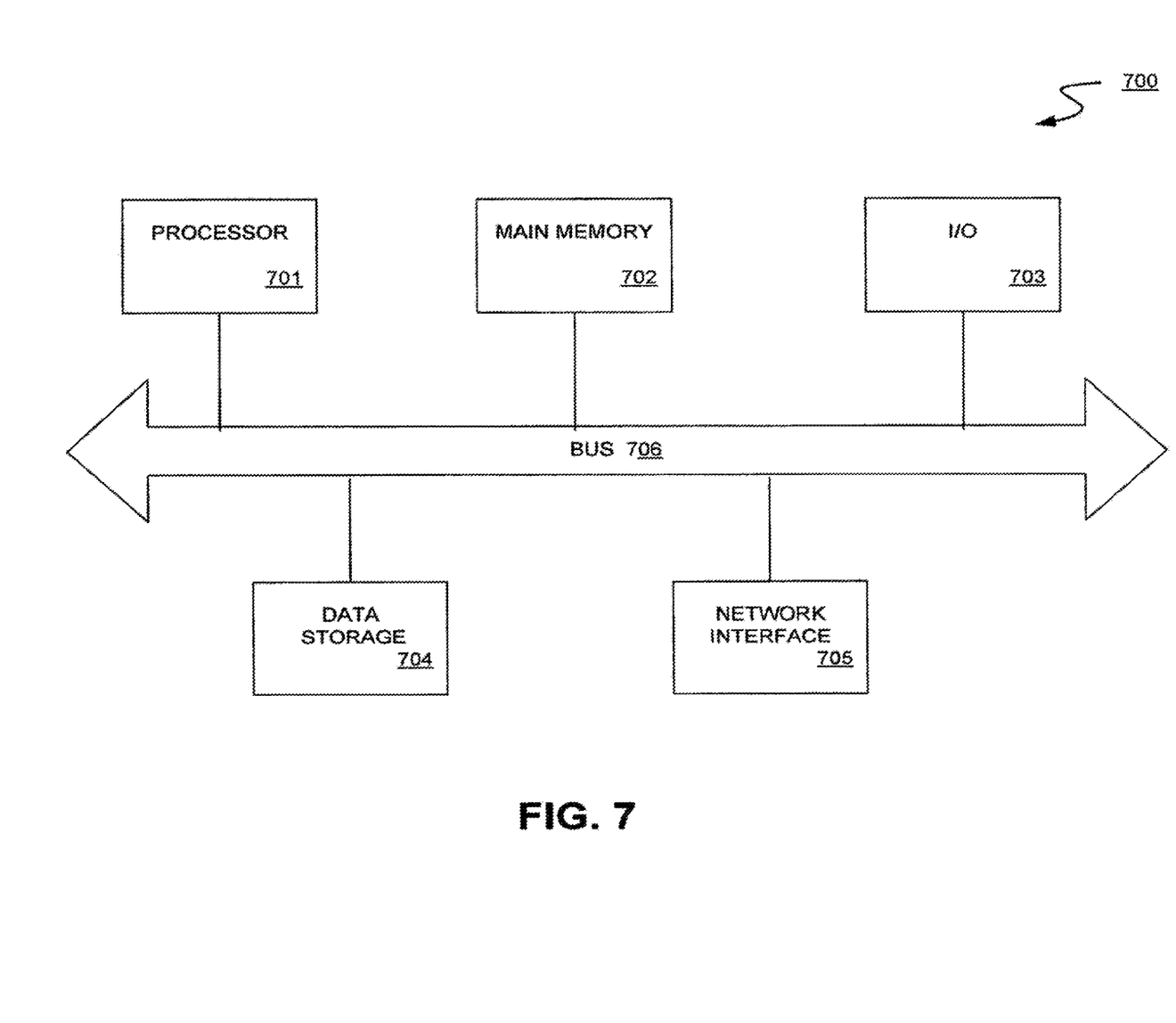
FIG. 7 illustrates one embodiment of a suitable computing environment in which certain aspects of the invention illustrated in FIGS. 1-6 may be practiced.

FIG. 7 illustrates one embodiment of a suitable computing environment in which certain aspects of the invention illustrated in FIGS. 1-6 may be practiced. In one embodiment, certain aspects of the confidential information management system may be implemented on a computer system 700 having components 701-706, including a processor 701, a memory 702, an Input/Output device 703, a data storage 704, and a network interface 705, coupled to each other via a bus 708. The components perform their conventional functions known in the art and provide the means for implementing the confidential information management system. Collectively, these components represent a broad category of hardware systems, including but not limited to general-purpose computer systems as well as special-purpose devices.

In one embodiment, the memory component 702, may include one or more of random access memory (RAM), and nonvolatile storage devices (e.g., magnetic or optical disks) on which are stored instructions and data for use by processor 701, including the instructions and data that comprise the components of the confidential information management system.

In one embodiment, the network interface component 705 may include the means for broadcasting the credibility coefficient data. The data storage component 704 may also represent the various pieces of data in the data console or biometric generator, including the signatures and other information used by the confidential information management system.

It is to be appreciated that various components of computer system 700 may be rearranged, and that certain implementations of the present invention may not require nor include all of the above components. Furthermore, additional components may be included in system 700, such as additional processors (e.g., a digital signal processor), storage devices, memories, network/communication interfaces, etc.

In the illustrated embodiment of FIG. 7, the method and apparatus for a confidential information management system in accordance with one embodiment of the invention as discussed above may be implemented as a series of software routines executed by computer system 700. The software routines may comprise a plurality or series of instructions, code sequences, configuration information, or other data to be accessed and/or executed by a processing system such as one or more of processor 701. Initially, the series of instructions, code sequences, configuration information, or other data may be stored on data storage 704 and transferred to memory 702 via bus 708. It is to be appreciated that the series of instructions, code sequences, configuration information, or other data can be stored a data storage 704 using any conventional computer-readable or machine-accessible storage medium, such as a diskette, CD-ROM, magnetic tape, DVD, ROM, smart card etc. It is also to be appreciated that the series of instructions, code sequences, configuration information, or other data need not be stored locally, and could be stored on a propagated data signal received from a remote storage device, such as a server on a local or worldwide network, via a network/communication interface 705. The instructions, code sequences, configuration information, or other data may be copied from the data storage 704, such as mass storage, or from the propagated data signal into a memory 702 and accessed and executed by processor 701.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for a method and apparatus for a confidential information management system. From the foregoing description, those skilled in the art will recognize that many other variations of the present invention are possible. Thus, the present invention is not limited by the details described. Instead, the present invention can be practiced with modifications and alterations within the spirit and scope of the appended claims.

The invention claimed is:

1. A method for managing confidential information, the method comprising:
    bonding a first biometric signature to a data storage device, wherein the data storage device is configured to store at least one data record that comprises confidential information related to an individual;
    maintaining a credibility rating associated with the at least one data record;
    querying a disclosure of metadata associated with the confidential information in the at least one data record;
    requiring the first biometric signature to access the data storage device;
    providing the metadata associated with the confidential information without providing the confidential information; and
    assigning different levels of importance to data records by assigning a first value to first data record and a second value to a second data record, wherein the provided metadata includes a combined value determined by the credibility rating and the assigned level of importance of each data record.

2. The method of claim 1, wherein the credibility rating is based upon at least one of the credibility of a person entering the confidential information in the data record, the credibility of a device used to verify the identity of the person entering the confidential information, the credibility of the individual the confidential information is related to, the credibility of the device used to enter the confidential information, and the credibility of the data record.

3. The method of claim 1, further comprising allowing the individual to deny at least one of a specific data query and a specific metadata query.

4. The method of claim 1, further comprising allowing the individual to authorize the disclosure of the data record or disclosure of metadata associated to the data record.

5. The method of claim 4, wherein the individual can authorize a partial disclosure of the data record or of the metadata associated to the data record.

6. The method of claim 1, further comprising recording a data entry history in the data record.

7. The method of claim 1, further comprising recording a query history in the data record.

8. The method of claim 7 wherein the query history comprises:
   a data query authorization code;
   an identification of the querying party;
   a unique identifier of the data console used to query a disclosure of the metadata;
   a biometric signature of the data console operator;
   a query time; and
   a query.

9. The method of claim 1 further comprising:
   generating an encryption key based on the biometric signature of the individual; and
   using the encryption key to encrypt the data record.

10. A system for managing confidential information, the system comprising:
   a biometric generator configured to analyze a unique biological characteristic of an individual and generate a first biometric signature associated with the individual, and bond the first biometric signature to a data storage device, wherein the data storage device is configured to store at least one data record that comprises confidential information related to the individual;
   a data storage device to store the data record, wherein the data storage device is configured to maintain a credibility rating associated with the at least one data record; and
   a data console configured to query a disclosure of metadata associated with the confidential information in the at least one data record, the data console also configured to require the first biometric signature to access the data storage device and provide the metadata associated with the confidential information without providing the confidential information;
   wherein the data storage device is further configured to assign different levels of importance to data records by assigning a first value to first data record and a second value to a second data record, wherein the provided metadata includes a combined value determined by the credibility rating and the assigned level of importance of each data record.

11. The system of claim 10, wherein the credibility rating is based upon at least one of the credibility of a person entering the confidential information in the data record, the credibility of a device used to verify the identity of the person entering the confidential information, the credibility of the individual the confidential information is related to, the credibility of the device used to enter the confidential information, and the credibility of the data record.

12. The system of claim 10, wherein the data storage device is further configured to allow the individual to deny at least one of a specific data query and a specific metadata query.

13. The system of claim 10, wherein the data storage device is further configured to allow the individual to authorize the disclosure of the data record or disclosure of metadata associated to the data record.

14. The system of claim 13, wherein the individual can authorize a partial disclosure of the data record or of the metadata associated to the data record.

15. The system of claim 10, wherein the data storage device is further configured to record a data entry history in the data record.

16. The system of claim 10, wherein the data storage device is further configured to record a query history in the data record.

17. The system of claim 16, wherein the query history comprises:
   a data query authorization code;
   an identification of the querying party;
   a unique identifier of the data console used to query a disclosure of the metadata;
   a biometric signature of the data console operator;
   a query time; and
   a query.

18. The system of claim 10, wherein the biometric generator is further configured to generate an encryption key based on the biometric signature of the individual, and to use the encryption key to encrypt the at least one data record.

* * * * *